United States Patent
Kim et al.

(10) Patent No.: US 10,864,713 B2
(45) Date of Patent: Dec. 15, 2020

(54) CURVED DISPLAY PANEL MANUFACTURING METHOD

(71) Applicant: TOVIS CO., LTD., Incheon (KR)

(72) Inventors: Yong Beom Kim, Incheon (KR); Woon Yong Park, Suwon-si (KR)

(73) Assignee: TOVIS CO., LTD., Incheon (KR)

( * ) Notice: Subject to any disclaimer, the term of this patent is extended or adjusted under 35 U.S.C. 154(b) by 518 days.

(21) Appl. No.: 15/480,767

(22) Filed: Apr. 6, 2017

(65) Prior Publication Data
US 2017/0210112 A1 Jul. 27, 2017

Related U.S. Application Data

(60) Division of application No. 14/317,988, filed on Jun. 27, 2014, which is a continuation-in-part of (Continued)

(30) Foreign Application Priority Data

Sep. 18, 2009 (KR) ......................... 10-2009-0088292

(51) Int. Cl.
*B32B 38/10* (2006.01)
*G02F 1/1333* (2006.01)
(Continued)

(52) U.S. Cl.
CPC ...... *B32B 38/1866* (2013.01); *B29C 45/1671* (2013.01); *B32B 17/064* (2013.01);
(Continued)

(58) Field of Classification Search
CPC .......... G02F 2001/133317; G02F 2001/13302; G02F 2001/133325; G02F 1/133528; B32B 43/006; B32B 2457/202; B65H 41/00
See application file for complete search history.

(56) References Cited

U.S. PATENT DOCUMENTS 5,273,475 A 12/1993 Oshikawa
5,596,671 A 1/1997 Rockwell, III
(Continued)

FOREIGN PATENT DOCUMENTS

JP 10-268270 A 10/1998
JP 2004-219551 A 8/2004
(Continued)

*Primary Examiner* — Scott W Dodds
(74) *Attorney, Agent, or Firm* — Novick, Kim & Lee, PLLC; Jae Youn Kim

(57) ABSTRACT

A method for manufacturing a curved display panel using a prefabricated flat liquid crystal panel including a lower substrate and an upper substrate formed of glass and opposite each other, each of the lower substrate and the upper substrate being provided with a polarizing plate, and a liquid crystal layer formed between the lower substrate and the upper substrate, includes separating the polarizing plates from the lower substrate and the upper substrate respectively, reducing a thickness of the liquid crystal panel, by removing an outer surface of each of the lower substrate and the upper substrate from which the polarizing plates are separated, to a designated thickness, and bending the liquid crystal panel having the designated thickness in a curved shape.

1 Claim, 5 Drawing Sheets

Related U.S. Application Data application No. 13/394,585, filed as application No. PCT/KR2010/005913 on Sep. 1, 2010, now abandoned.

(51) Int. Cl.

| | | |
|---|---|---|
| *B32B 38/18* | (2006.01) | |
| *B32B 37/12* | (2006.01) | |
| *B32B 37/18* | (2006.01) | |
| *B29C 45/16* | (2006.01) | |
| *B32B 17/06* | (2006.01) | |
| *G02F 1/1335* | (2006.01) | |
| *B32B 43/00* | (2006.01) | |
| *B29K 709/08* | (2006.01) | |
| *B29L 31/34* | (2006.01) | |

(52) U.S. Cl.
CPC .......... *B32B 37/12* (2013.01); *B32B 37/1284* (2013.01); *B32B 37/18* (2013.01); *B32B 43/006* (2013.01); *G02F 1/1333* (2013.01); *G02F 1/133528* (2013.01); *B29K 2709/08* (2013.01); *B29K 2995/0026* (2013.01); *B29K 2995/0034* (2013.01); *B29L 2031/3475* (2013.01); *B32B 2037/1253* (2013.01); *B32B 2307/40* (2013.01); *B32B 2307/412* (2013.01); *B32B 2307/42* (2013.01); *B32B 2310/0831* (2013.01); *B32B 2457/202* (2013.01); *G02F 2001/133302* (2013.01); *Y10T 156/103* (2015.01)

(56) References Cited

U.S. PATENT DOCUMENTS

| | | | |
|---|---|---|---|
| 6,204,906 B1 * | 3/2001 | Tannas, Jr. ............ G02F 1/1339 | |
| | | | 349/153 |
| 6,897,916 B2 | 5/2005 | Hamamoto | |
| 7,920,223 B2 * | 4/2011 | Nishizawa ........ G02F 1/133308 | |
| | | | 349/58 |
| 7,951,866 B2 | 5/2011 | Nakabayashi | |
| 8,734,707 B2 * | 5/2014 | Lee ............................ 264/494 | |
| 2003/0128329 A1 * | 7/2003 | Kim ................. G06F 1/133553 | |
| | | | 349/187 |
| 2005/0185116 A1 * | 8/2005 | Higashi ............. G02F 1/133308 | |
| | | | 349/96 |
| 2006/0098153 A1 | 5/2006 | Slikkerveer et al. | |
| 2006/0273304 A1 | 12/2006 | Cok | |
| 2008/0007675 A1 | 1/2008 | Sanelle et al. | |
| 2008/0278810 A1 | 11/2008 | Kim et al. | |
| 2009/0015747 A1 | 1/2009 | Nishizawa et al. | |
| 2009/0115933 A1 | 5/2009 | Mimura | |
| 2009/0201443 A1 | 8/2009 | Sasaki et al. | |
| 2011/0109846 A1 * | 5/2011 | Liao ...................... G02F 1/1333 | |
| | | | 349/96 |
| 2011/0134655 A1 | 6/2011 | Ohtani et al. | |
| 2013/0061877 A1 * | 3/2013 | Nakagawa ............. B24C 1/003 | |
| | | | 134/7 |

FOREIGN PATENT DOCUMENTS

| | | | |
|---|---|---|---|
| JP | 2009-020168 A | 1/2009 | |
| JP | 2009-115933 A | 5/2009 | |
| KR | 10-0435826 B1 | 8/2004 | |
| KR | 10-2005-0085066 A | 8/2005 | |
| KR | 10-2008-0048272 A | 6/2008 | |
| WO | WO-2012036389 A2 * | 3/2012 | ....... G02F 1/133305 |

* cited by examiner

CURVED DISPLAY PANEL MANUFACTURING METHOD

REFERENCE TO RELATED APPLICATION

This application is a divisional application of application Ser. No. 14/317,988 filed on Jun. 27, 2014, the disclosure of which is incorporated by reference in its entirety.

BACKGROUND OF THE INVENTION

Field of the Invention

The present invention relates to a display panel manufacturing method for manufacturing a display panel in a curved shape.

Description of the Related Art

As display technology advances, various kinds of display devices are being developed and used. From among these display devices, there is a liquid crystal display device to display an image using liquid crystals.

A liquid crystal panel of a general liquid crystal display (LCD) includes two substrates and a liquid crystal layer having dielectric anisotropy interposed between the two substrates. The liquid crystal panel applies an electric field to the liquid crystal layer and adjusts an intensity of the electric field to adjust transmittance of light passing through the liquid crystal layer, thereby obtaining a desired image. Such an LCD is a representative one of flat panel displays (FPDs) which are handy to carry. From among various LCDs, a TFT-LCD using thin film transistors (TFTs) as switching elements is mainly used.

From among the two substrates of the liquid crystal panel which are opposite each other, a plurality of display signal lines, i.e., gate lines and data lines, a plurality of thin film transistors and pixel electrodes are formed on the lower substrate, and color filters and a common electrode are formed on the upper substrate. Further, polarizing plates are attached to the outer surfaces of the two glass substrates.

Such a liquid crystal panel is generally manufactured in a flat shape. Therefore, if a curved display is required, the general flat liquid crystal panel may not be used.

In order to solve such a problem, a flexible liquid crystal panel which employs substrates formed of a flexible material rather than glass substrates used in the conventional liquid crystal panel so as to be curved if external force is applied to the flexible liquid crystal panel has been developed.

However, the above conventional flexible liquid crystal panel has a difficult manufacturing process and high manufacturing costs.

SUMMARY OF THE INVENTION

Therefore, the present invention has been made in view of the above problems, and it is an object of the present invention to provide a curved display panel manufacturing method for simply manufacturing a display panel in a bent shape using a general flat liquid crystal panel including polarizing plates and glass substrates to which electronic circuits necessary for driving are attached.

In accordance with an aspect of the present invention, the above and other objects can be accomplished by the provision of a curved display panel manufacturing method in which a display panel in a desired curved shape is manufactured using a prefabricated flat liquid crystal panel including a lower substrate and an upper substrate formed of glass and opposite each other, each of the lower substrate and an upper substrate being provided with a polarizing plate, and a liquid crystal layer formed between the lower substrate and the upper substrate, including separating the polarizing plates from the lower substrate and the upper substrate, removing the outer surface of the liquid crystal panel to reduce the lower substrate and the upper substrate from which the polarizing plates are separated to a designated thickness, bending the liquid crystal panel having the removed outer surface in a desired curved shape, and attaching prefabricated transparent substrates bent in the same curved shape as the desired curved shape to the liquid crystal panel bent in the desired curved shape using an adhesive so as to maintain the curved shape of the liquid crystal panel.

The curved display panel manufacturing method may further include re-attaching the separated polarizing plates to the lower substrate and the upper substrate, after the bending of the liquid crystal panel having the removed outer surface in the desired curved shape.

The liquid crystal panel may further include a tab electrically connected to the liquid crystal panel, and the curved display panel manufacturing method may further include separating the tab from the liquid crystal panel before the removal of the outer surface of the liquid crystal panel and re-attaching the separated tab to the liquid crystal panel after the attachment of the transparent substrates to the liquid crystal panel.

The removal of the outer surface of the liquid crystal panel to reduce the lower substrate and the upper substrate from which the polarizing plates are separated to a designated thickness may include masking parts of the upper substrate or the lower substrate where protrusions separating the transparent substrates from the lower substrate or the upper substrate will be formed with masking members preventing removal of the outer surface of the liquid crystal panel so as to form the protrusions.

The curved display panel manufacturing method may further include attaching separation members having a random thickness to the lower substrate or the upper substrate so as to form protrusions separating the transparent substrates from the lower substrate or the upper substrate, before the attachment of the transparent substrates to the liquid crystal panel bent in the desired curved shape so as to maintain the curved shape of the liquid crystal panel.

The protrusions may be formed at both ends of the lower substrate or the upper substrate.

The curved display panel manufacturing method may further include injecting a liquid transparent polymer into spaces between the liquid crystal panel and the transparent substrates, attached to the liquid crystal panel while being separated from the liquid crystal panel by the protrusions, and then hardening the injected liquid transparent polymer, after the attachment of the transparent substrates to the liquid crystal panel bent in the desired curved shape so as to maintain the curved shape of the liquid crystal panel.

The separation of the polarizing plates from the lower substrate and the upper substrate may include cooling the liquid crystal panel to a sub-zero temperature so that an adhesive attaching the polarizing plates to the lower substrate and the upper substrate loses adhesive force.

In accordance with another aspect of the present invention, there is provided a curved display panel manufacturing method in which a display panel in a desired curved shape is manufactured using a prefabricated flat liquid crystal panel including a lower substrate and an upper substrate formed of glass and opposite each other, each of the lower substrate and an upper substrate being provided with a polarizing plate, and a liquid crystal layer formed between the lower substrate and the upper substrate, including separating the polarizing plates from the lower substrate and the upper substrate, removing the outer surface of the liquid crystal panel to reduce the lower substrate and the upper substrate from which the polarizing plates are separated to a designated thickness, bending the liquid crystal panel having the removed outer surface in a desired curved shape, re-attaching the separated polarizing plates to the lower substrate and the upper substrate, and forming transparent polymer layers on the outer surface of the liquid crystal panel by loading the liquid crystal panel into a mold set formed in the same curved shape as the desired curved shape, injecting a liquid transparent polymer into the mold set, and hardening the liquid transparent polymer, so as to maintain the curved shape of the liquid crystal panel.

The curved display panel manufacturing method may further include setting the thickness of the transparent polymer layers to be formed within the mold set, before the formation of the transparent polymer layers on the outer surface of the liquid crystal panel.

In accordance with yet another aspect of the present invention, there is provided a curved display panel manufacturing method in which a display panel in a desired curved shape is manufactured using a prefabricated flat liquid crystal panel including a lower substrate and an upper substrate formed of glass and opposite each other, each of the lower substrate and an upper substrate being provided with a polarizing plate, and a liquid crystal layer formed between the lower substrate and the upper substrate, including separating the polarizing plates from the lower substrate and the upper substrate, removing the outer surface of the liquid crystal panel to reduce the lower substrate and the upper substrate from which the polarizing plates are separated to a designated thickness, bending the liquid crystal panel having the removed outer surface in a desired curved shape, forming polarizing patterns on prefabricated transparent substrates bent in the same curved shape as the desired curved shape, and attaching the prefabricated transparent substrates to the outer surface of the liquid crystal panel bent in the desired curved shape so as to maintain the curved shape of the liquid crystal panel.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
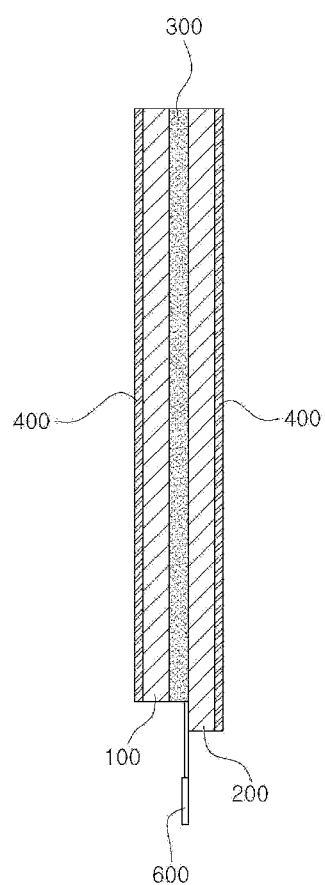
FIG. 1 is a sectional view illustrating a general liquid crystal panel to which a curved display panel manufacturing method in accordance with the present invention is applied.

Hereinafter, embodiments of the present invention will be described in more detail with reference to the accompanying drawings.

In the drawings, the thickness of each of several layers and regions is exaggerated for convenience of description and clarity. Wherever possible, the same reference numbers will be used throughout the drawings to refer to the same or like parts. It will be understood that when an element is referred to as being "on" or "under" another element, it can be directly on/under the element, and one or more intervening elements may also be present. However, when an element is referred to as being directly "on" or "under" another element, one or more intervening elements are not present.

Further, in the specification, the terms "two substrates", "lower substrate" and "upper substrate" include the concept of one or both of a lower substrate and an upper substrate.

First Embodiment

A display panel manufacturing method in accordance with one embodiment of the present invention is a method for manufacturing a display panel in a curved shape using a general liquid crystal panel.

Here, the general liquid crystal panel means a ready-made liquid crystal panel.

With reference to FIG. 1, the general liquid crystal panel includes a lower substrate 100 and an upper substrate 200 which are formed of glass and are opposite each other, and a liquid crystal layer 300 formed between the lower substrate 100 and the upper substrate 200 and including liquid crystal molecules oriented vertically or horizontally with respect to the two substrates 100 and 200. If the lower substrate 100 is referred to as a thin film transistor array substrate, the upper substrate 200 is referred to as a color filter array substrate.

A sealant (not shown) formed of a material to bond the two substrates 100 and 200, defining a part filled with liquid crystals, and preventing leakage of the liquid crystals may be formed at the edges of the two substrates 100 and 200.

Further, the general liquid crystal panel may include polarizing plates 400 polarizing light and attached to both or one of the outer surfaces of the two substrates 100 and 200.

Further, a tab 600 may be installed on the liquid crystal panel.

Here, the tab 600 may be an electrode electrically connected to the thin transistor array substrate among the lower substrate 100 and the upper substrate 200. The tab 600 may be formed in a flexible film type and include various semiconductors and electrical elements and a circuit board including the same.

Hereinafter, a display panel manufacturing method for manufacturing a display panel in a curved shape in accordance with one embodiment of the present invention will be described with reference to FIGS. 2(a) to 2(f).

First, as exemplarily shown in FIG. 2(a), if the polarizing plate 400 is attached to one or both of the upper substrate 200 and the lower substrate 100, all the polarizing plates 400 are separated from the upper substrate 200 and the lower substrate 100.

The reason why the polarizing plates 400 are separated from the upper substrate 200 and the lower substrate 100 is to perform etching to reduce the thickness of the lower substrate 100 and the upper substrate 200.

The separated polarizing plates 400 may be formed in a flexible film type or a hard plate type.

As one exemplarily method of separating the polarizing plate 400 from the lower substrate 100 or the upper substrate 200, the liquid crystal panel may be quickly cooled to a sub-zero temperature of about −30° C. or below at which an adhesive loses viscosity.

Here, in order to prevent spotted defects on the surface of the liquid crystal panel due to condensation of water vapor during cooling and damages to the polarizing plates 400, separation may be performed under a dry environmental condition.

Further, a protective film may be attached to the surfaces of the separated polarizing plates 400 to which the adhesive is applied and then the polarizing plates 400 may be stored for reuse.

As other exemplary methods of separating the polarizing plate 400 from the lower substrate 100 or the upper substrate 200, the polarizing plate 400 may be soaked in a solvent to dissolve the adhesive attached to the lower substrate 100 or the upper substrate 200, or a solvent may be sprayed or injected between the polarizing plate 400 and the lower substrate 100 or the upper substrate 200.

Further, if the tab 600 is installed on the liquid crystal panel, the tab 600 may be removed from the liquid crystal panel before or after the polarizing plate 400 is separated from the lower substrate 100 or the upper substrate 200.

Here, the reason why the tab 600 is removed from the liquid crystal panel is to prevent the tab 600 from being corroded by an etching solution or to prevent foreign substances from flowing into the tab 600, when the lower substrate 100 and the upper substrate 200 are partially removed, as descried below.

Figure 2:
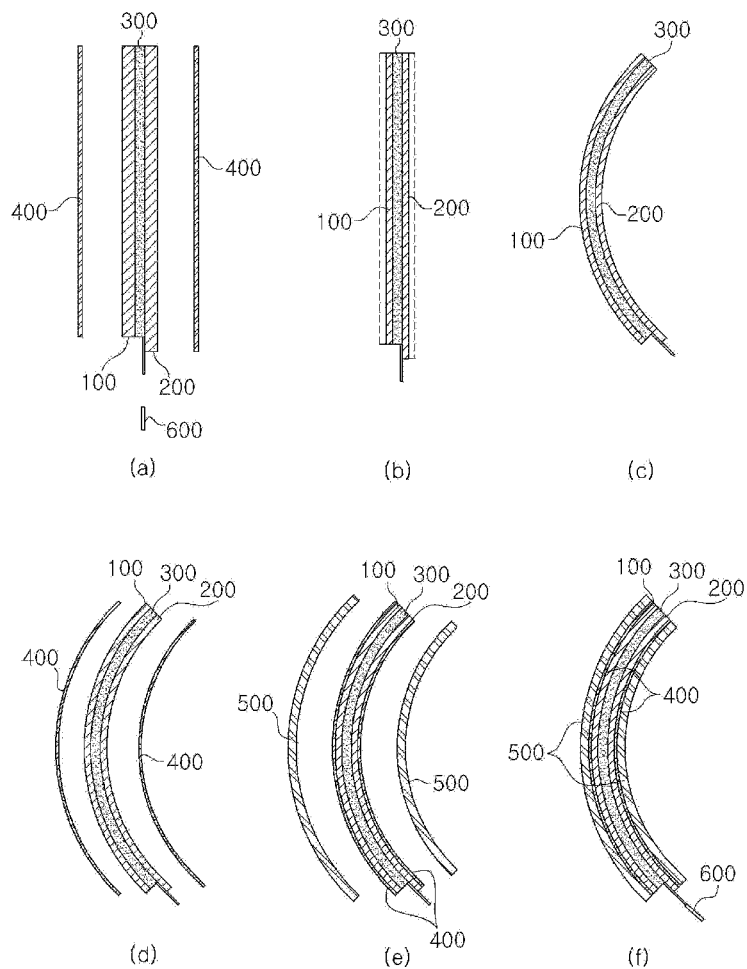
FIGS. 2(a) to 2(f) are schematic views illustrating a curved display panel manufacturing method in accordance with one embodiment of the present invention.

As exemplarily shown in FIG. 2(*b*), the outer surfaces of the lower substrate 100 and the upper substrate 200 are removed to be reduced to a predetermined thickness. Here, the predetermined thickness may have a value within the range of 50 to 150 μm.

The reason why the outer surfaces of the lower substrate 100 and the upper substrate 200 are removed so that the lower substrate 100 and the upper substrate 200 have a reduced thickness is to bend the lower substrate 100 and upper substrate 200 without breakage.

If the thickness of each of the lower substrate 100 and the upper substrate 200 after removal of the outer surfaces of the lower substrate 100 and the upper substrate 200 is less than 50 μm or greater than 150 μm, the lower substrate 100 and the upper substrate 200 may be easily broken or may not be easily bent during the bending process of the lower substrate 100 and the upper substrate 200.

The outer surfaces of the lower substrate 100 and the upper substrate 200 may be removed through a conventionally known method, for example, a mechanical polishing method or an etching method using an etching solution.

Figure 3:
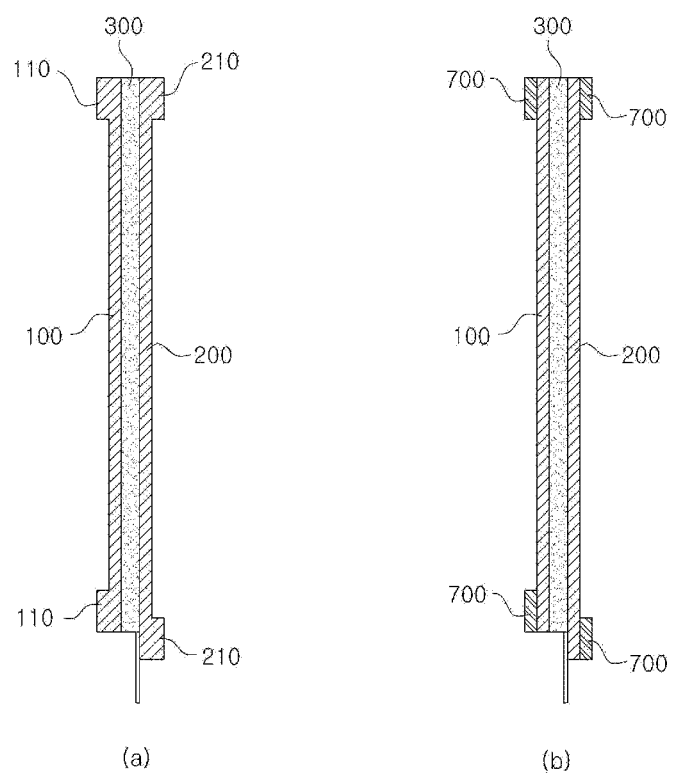
FIGS. 3(a) and 3(b) are views protrusions formed on a lower substrate and an upper substrate in the curved display panel manufacturing method in accordance with the embodiment of the present invention.

As exemplarily shown in FIG. 3(*a*), when the outer surfaces of the lower substrate 100 and the upper substrate 200 are removed, the outer surfaces of the lower substrate 100 and the upper substrate 200 are removed such that protrusions 110 and 210 are formed on the lower substrate 100 and upper substrate 200.

Here, the protrusions 110 and 210 mean parts formed on the lower substrate 100 and the upper substrate 200 allowing transparent polymer layers 510 or transparent substrates 500, which will be described later, to be formed on or attached to the lower substrate 100 and the upper substrate 200 by a designated separation distance when the transparent polymer layers 510 or the transparent substrates 500 are formed on or attached to the lower substrate 100 and the upper substrate 200.

The protrusions 110 and 210 may be formed at both side ends or edges of four sides of the lower substrate 100 and the upper substrate 200, or be formed at the middle parts of the lower substrate 100 and the upper substrate 200.

When the outer surfaces of the lower substrate 100 and the upper substrate 200 are removed, masking may be performed at parts of the lower substrate 100 and the upper substrate 200 where the protrusions 110 and 210 will be formed so that the parts of the lower substrate 100 and the upper substrate 200 are not removed and maintain the existing thickness.

Masking may be performed by attaching masking members to the parts of the lower substrate 100 and the upper substrate 200 where the protrusions 110 and 210 will be formed before the outer surfaces of the lower substrate 100 and the upper substrate 200 are removed, and the protrusions 110 and 210 having the existing thickness may be formed by removing the outer surfaces of the lower substrate 100 and the upper substrate 200 under the condition that the masking members are attached to the parts of the lower substrate 100 and the upper substrate 200.

Here, the masking members may be jigs surrounding parts of the lower substrate 100 and the upper substrate 200, or masking tapes attachable to the lower substrate 100 and the upper substrate 200.

When the protrusions 110 and 210 are formed by performing masking using masking members, the outer surfaces of the upper substrate 200 and the lower substrate 100 are removed through an etching method. If the masking members are masking tapes, masking tapes having acid resistance which are not corroded by an etching solution may be used.

Further, if the masking members are jigs, sealing members having acid resistance preventing an etching solution from flowing into spaces between the lower and upper substrates 200 and 100 and the jigs may be used. If the tab 600 is not separated from the liquid crystal panel, jigs may be configured such that the jigs together with the tab 600 surround the parts of the lower substrate 100 and the upper substrate 200 where the protrusions 110 and 210 will be formed.

As exemplarily shown in FIG. 3(*b*), the protrusions 110 and 210 may be formed by attaching separation members 700 to the two substrates 100 and 200 instead of prevention of removal of the outer surfaces of the two substrates 100 and 200.

That is, the protrusions 110 and 210 may be formed by attaching the separation members 700 having the thickness of the protrusions 110 and 210 to the parts of the lower substrate 100 and the upper substrate 200 cut to the predetermined thickness. The separation members 700 may be attached to the lower substrate 100 and the upper substrate 200 by an adhesive.

As exemplarily shown in FIG. 2(*c*), after the lower substrate 100 and the upper substrate 200 are reduced to the predetermined thickness by removing the outer surfaces of the lower substrate 100 and the upper substrate 200, the liquid crystal panel is bent in a desired curved shape.

The liquid crystal panel may be bent such that the surface of the liquid crystal panel reproducing and displaying an image is concave or convex, be bent by applying pressure to the liquid crystal panel in leftward and rightward directions or in the upward and downward direction based on the center of the liquid crystal panel, and/or be bent in various curved shapes, such as an "S" shape or a waveform shape.

Further, the liquid crystal panel may be bent in a partially curved shape, for example, a "J" shape, some parts of which are plane and the remaining parts of which are curved.

If the protrusions 110 and 210 are formed on the liquid crystal panel, the protrusions 110 and 210 have a higher thickness than the cut lower substrate 100 and upper substrate 200 and thus have higher hardness than the cut lower substrate 100 and upper substrate 200. Therefore, the liquid crystal panel may be bent under the condition that the protrusions 110 and 210 are gripped.

As exemplarily shown in FIG. 2(d), under the condition that the liquid crystal panel is bent, the separated polarizing plates 400 are attached again to the outer surfaces of the upper substrate 200 and the lower substrate 100.

Since the polarizing plates 400 are attached to the liquid crystal panel in the bent state using the adhesive provided on the polarizing plates 400, the attached polarizing plates 400 may maintain the bent state of the liquid crystal panel.

The reason why the polarizing plates 400 are not attached to the liquid crystal panel in the flat state but are attached to the liquid crystal panel in the bent state is not only to relatively reduce restoring force of the liquid crystal panel in the curved shape to the flat state but also to prevent deformation of the polarizing plates 400 during extended use for a long time.

As exemplarily shown in FIG. 2(e), after the polarizing plates 400 are attached to the liquid crystal panel, transparent substrates 500 which are prefabricated in the same shape as the desired curved shape may be attached to the outer surfaces of the lower substrate 100 and the upper substrate 200.

Here, the outer surfaces of the lower substrate 100 and the upper substrate 200 may mean the outer surfaces of the polarizing plates 400 attached to the lower substrate 100 and the upper substrate 200.

The transparent substrates 500 may be substrates formed of a transparent or semi-transparent material, such as glass or a synthetic resin.

Further, the transparent substrates 500 mean reinforcing plates in a curved shape which are formed of a material having high hardness and maintaining the curved shape of the bent liquid crystal panel so as not to be spread again into the flat shape.

Figure 4:
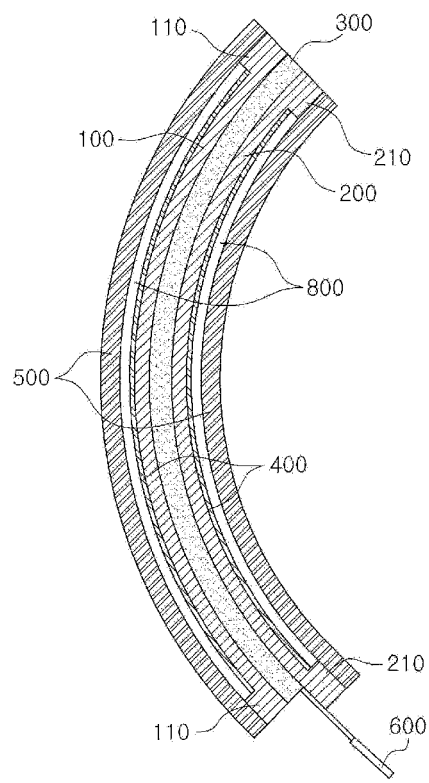
FIG. 4 is a sectional view of a display panel manufactured using the lower substrate and the upper substrate provided with the protrusions of FIG. 3.

The transparent substrates 500 may be attached to the entire outer surfaces of the lower substrate 100 and the upper substrate 200, or be attached to the outer surfaces of the protrusions 110 and 210 if the protrusions 110 and 210 are formed on the lower substrate 100 and the upper substrate 200, as exemplarily shown in FIG. 4.

Further, an adhesive may be applied to the transparent substrates 500 or the lower and upper substrates 100 and 200 and then the transparent substrates 500 may be attached to the outer surfaces of the lower and upper substrates 100 and 200 by the adhesive, and the adhesive may be an optically clear adhesive (OCA).

As described above, if the transparent substrates 500 bent in advance in the desired curved shape are attached to the entire outer surfaces of the lower and upper substrates 100 and 200 using the adhesive, the transparent substrates 500 bent in advance maintain the bent state of the liquid crystal panel at uniform force and thus, deformation generated due to concentration of bending force on some parts may be reduced and moire may be prevented.

Further, since the transparent substrates 500 are attached to the lower and upper substrates 100 and 200 by the adhesive applied to the entire surfaces of the transparent substrates 500 or the lower and upper substrates 100 and 200, inflow of air bubbles and foreign substances between the transparent substrates 500 and the lower and upper substrates 100 and 200 may be prevented and a clear image of a high quality may be provided.

Further, since the adhesive forming layers between the transparent substrates 500 and the lower and upper substrates 100 and 200 attaches the transparent substrates 500 to the lower and upper substrates 100 and 200, the adhesive may provide uniform adhesive force between the transparent substrates 500 bent in advance in the desired curved shape and the liquid crystal panel.

If the protrusions 110 and 210 are formed on the lower substrate 100 and the upper substrate 200 and the transparent substrates 500, i.e., reinforcing plates for maintaining the curved shape, are attached to the outer surfaces of the protrusions 110 and 210, a transparent polymer in a liquid state may be injected into separation spaces 800 between the transparent substrates 500 and the lower and upper substrates 100 and 200 and be hardened so as to unify the transparent substrates 500 and the lower and upper substrates 100 and 200 (with reference to FIG. 4).

That is, generation of moire may be prevented due to the separation spaces 800, but foreign substances may be introduced into the separation spaces 800 and degradation of an image quality may be generated due to scattering of light by air layers. In order to prevent such drawbacks, the transparent substrates 500 and the lower and upper substrates 100 and 200 may be unified by filling the separation spaces 800 between the transparent substrates 500 and the lower and upper substrates 100 and 200 with a transparent polymer.

Further, the transparent polymer filling the separation spaces 800 may perform a function of bonding the transparent substrates 500 and the lower and upper substrates 100 and 200, thus performing a function of firmly supporting the bent liquid crystal panel.

Further, if the transparent polymer filling the separation spaces 800 is hardened, the transparent polymer may perform a function of maintaining the curved shape of the liquid crystal panel. Therefore, together with the transparent substrates 500 serving as the reinforcing plates to maintain the curved shape, the transparent polymer may further improve force of maintaining the curved shape of the liquid crystal panel and thus, the thickness of the transparent substrates 500 may be reduced.

Here, the transparent polymer may be a random transparent or semi-transparent polymer, such as s transparent UV resin.

Further, as exemplarily shown in FIG. 2(f), when the transparent substrates 500 are attached to the lower substrate 100 and the upper substrate 200, if the tab 600 is separated from the liquid crystal panel, the separated tab 600 is combined again with the liquid crystal panel and thereby, manufacture of the curved display panel is completed.

Although this embodiment describes that the tab 600 is re-attached to the liquid crystal panel after the transparent substrates 500 are attached to the lower substrate 100 and the upper substrate 200, the tab 600 may be re-attached to the liquid crystal panel before or when the transparent substrates 500 are attached to the lower substrate 100 and the upper substrate 200, or re-attachment of the tab 600 to the liquid crystal panel may be performed after the transparent polymer fills the separation spaces 800 and is hardened.

Further, although this embodiment describes that the polarizing plates 400 are attached to the lower substrate 100 and the upper substrate 200 of the bent liquid crystal panel before the transparent substrates 500 are attached to the liquid crystal panel, the polarizing plates 400 may be attached to the outer surfaces of the transparent substrates 500 after the transparent substrates 500 are attached to the liquid crystal panel.

Therefore, the curved display panel manufactured by the curved display panel manufacturing method in accordance with one embodiment of the present invention may be configured such that the lower substrate 100 and the upper substrate 200 may maintain a desired curved shape by removing the outer surfaces of the lower substrate 100 and the upper substrate 200 so as to have a reduced thickness, bending the lower substrate 100 and the upper substrate 200 into the desired curved shape, and then attaching the reinforcing plates for maintaining the curved shape, i.e., the transparent substrates 500, to the bent lower substrate 100 and upper substrate 200.

Second Embodiment

Hereinafter, a curved display panel manufacturing method in accordance with another embodiment of the present invention will be described. Some parts in this embodiment which are substantially the same as those in the former embodiment shown in FIGS. 2(*a*) to 4 are denoted by the same reference numerals even though they are depicted in different drawings and a detailed description of functions and effects thereof will thus be omitted because it is considered to be unnecessary.

The curved display panel manufacturing method in accordance with this embodiment of the present invention is the same as the curved display panel manufacturing method in accordance with the former embodiment of the present invention except that transparent polymer layers 510 are formed on a liquid crystal panel instead of attachment of the transparent plates 500, serving as reinforcing plates for maintaining the curved shape, to the liquid crystal panel.

Figure 5:
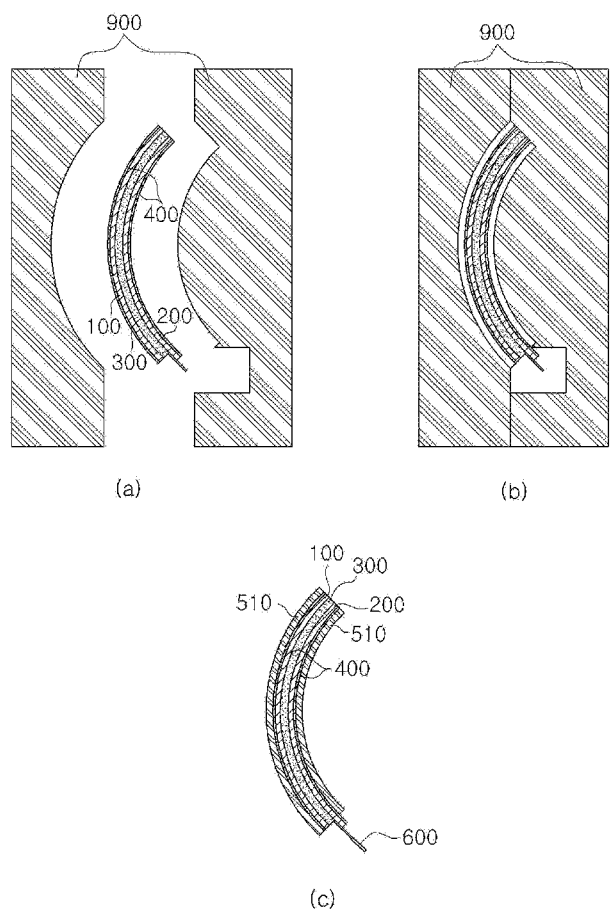
FIGS. 5(a) to 5(c) are schematic views illustrating a curved display panel manufacturing method in accordance with another embodiment of the present invention.

As exemplarily shown in FIGS. 5(*a*) to 5(*c*), the transparent polymer layers 510 bent in a desired curved shape in accordance with this embodiment may be formed on the outer surfaces of the polarizing plates 400 attached to the upper substrate 200 and the lower substrate 100 of the liquid crystal panel.

Further, the transparent polymer layers 510 may be formed by loading the bent liquid crystal panel into a mold set 900 on which a desired curved shape of the transparent polymer layers 510 is formed.

The thickness of the transparent polymer layers 510 to be formed may be set before or after the liquid crystal panel is loaded into the mold set 900 to form the transparent polymer layers 510.

For example, the thickness of the transparent polymer layers 510 to be formed may be set by inserting thin platy mold pieces formed in the shape of the transparent polymer layers 510 and having a random thickness into the mold set 900 or by locating the liquid crystal panel loaded into the mold set 900 at a position close to or distant from the positions of the transparent polymer layers 510 to be which will be formed.

Since force of supporting the bent liquid crystal panel and light transmittance of the liquid crystal panel vary according to the thickness of the transparent polymer layers 510 formed on the liquid crystal panel, setting of the thickness of the transparent polymer layers 510 to be formed is important. The thickness of the transparent polymer layers 510 to be formed may be frequently changed according to a screen size of the liquid crystal panel which will be manufactured.

Further, when the thickness of the transparent polymer layers 510 to be formed is set, a liquid transparent polymer is injected into the mold set 900 and then, the liquid crystal panel is unloaded from the mold set 900 after a random time to harden the transparent polymer has elapsed. Thereby, formation of the transparent polymer layers 510 on the liquid crystal panel is completed.

Here, the transparent polymer may be a random transparent or semi-transparent polymer, such as a transparent UV resin.

When formation of the transparent polymer layers 510 on the liquid crystal panel has been completed, a tab 600 may be attached to the liquid crystal panel as in the former embodiment of the present invention.

Therefore, if the transparent polymer layers 510 are formed on the liquid crystal panel instead of the transparent substrates 500, the transparent polymer layers 510 are unified with the outer surfaces of the lower substrate 100 and the upper substrate 200 during the hardening process of the liquid transparent polymer and thus, as the transparent polymer layers 510 are hardened, the lower substrate 100, the upper substrate, and the transparent polymer layers 510 may maintain the desired curved shape.

Further, the transparent polymer layers 510 are unified with the lower substrate 100 and the upper substrate 200 and thus, inflow of air bubbles and foreign substances into spaces between the transparent polymer layers 510 and the lower and upper substrates 100 and 200 may be prevented and the liquid crystal panel in the bent state may be firmly fixed.

Third Embodiment

Hereinafter, a curved display panel manufacturing method in accordance with yet another embodiment of the present invention will be described. Some parts in this embodiment which are substantially the same as those in the former embodiment shown in FIGS. 2(*a*) to 4 are denoted by the same reference numerals even though they are depicted in different drawings and a detailed description of functions and effects thereof will thus be omitted because it is considered to be unnecessary.

The curved display panel manufacturing method in accordance with this embodiment of the present invention is the same as the curved display panel manufacturing method in accordance with one of the former embodiments of the present invention except that, after the liquid crystal panel is bent in a desired curved shape, the separated polarizing plates 400 are not re-attached to the liquid crystal panel and polarizing patterns are formed on the transparent substrates 500 or the transparent polymer layers 510 in accordance with one of the former embodiments of the present invention.

That is, the liquid crystal panel is bent in a desired curved shape and, after or before the transparent substrates 500 are attached to or the transparent polymer layers 510 are formed on the outer surfaces of the lower substrate 100 and the upper substrate 200, polarizing patterns performing the function of the polarizing plates 400 may be formed on the outer surfaces of the transparent substrates 500 or the outer surfaces of the transparent polymer layers 510.

These polarizing patterns are formed in the same shape as polarizing patterns formed on the separated polarizing patterns 400 and may be formed through laser processing on the outer surfaces of the transparent substrates 500 or the transparent polymer layers 510.

Therefore, the curved display panel manufacturing method in accordance with this embodiment of the present invention may prevent inflow of foreign substances due to re-attachment of the polarizing plates 400 and manufacture a curved display panel having a reduced thickness.

As apparent from the above description, in a curved display panel manufacturing method in accordance with one embodiment of the present invention, parts of outer surfaces of a lower substrate and an upper substrate of a general liquid crystal panel are removed so as to reduce the thickness of the lower and upper substrates, the lower and upper substrates are bent in a curved shape, and then, transparent polymer layers are formed on or transparent substrates are attached to the outer surfaces of the lower and upper substrates so as to maintain the curved shape, thus simply manufacturing a display panel bent in a curved shape.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a curved display panel using a prefabricated flat liquid crystal panel including a lower substrate and an upper substrate formed of glass and opposite to each other, polarizing plates respectively attached to the lower substrate and the upper substrate, and a liquid crystal layer disposed between the lower substrate and the upper substrate, the method comprising:

separating the polarizing plates from the lower substrate and the upper substrate respectively;

removing outer surfaces of the lower substrate and the upper substrate;

bending the liquid crystal panel to have a curved shape;

re-attaching the separated polarizing plates to the lower substrate and the upper substrate each having a reduced thickness;

preparing a mold set including two mold pieces each having a curved surface with a same curvature as that of the bent liquid crystal panel;

positioning the bent liquid crystal panel between the two mold pieces and assembling the two mold pieces to form an assembled mold set having an inner space for accommodating and supporting the bent liquid crystal panel, wherein the polarizing plates re-attached on the bent liquid crystal panel are spaced apart from the curved surfaces of the two mold pieces while being supported by the assembled mold set;

injecting a liquid transparent polymer into the assembled mold set in which the bent liquid crystal panel is accommodated;

hardening the liquid transparent polymer to form transparent polymer layers on the bent liquid crystal panel; and unloading the bent liquid crystal panel having the transparent polymer layers from the mold set.

* * * * *